(12) United States Patent
Satoh et al.

(10) Patent No.: US 6,750,941 B2
(45) Date of Patent: Jun. 15, 2004

(54) COMPLEX DIFFRACTION DEVICE

(75) Inventors: Yasushi Satoh, Kanagawa (JP); Yoshihiro Kumagai, Kanagawa (JP); Takehiro Toyooka, Kanagawa (JP)

(73) Assignee: Nippon Mitsubishi Oil Corporation, Tokyo (JP)

( * ) Notice: Subject to any disclaimer, the term of this patent is extended or adjusted under 35 U.S.C. 154(b) by 0 days.

(21) Appl. No.: 10/104,699

(22) Filed: Mar. 22, 2002

(65) Prior Publication Data

US 2002/0101560 A1 Aug. 1, 2002

Related U.S. Application Data

(63) Continuation of application No. PCT/JP00/06551, filed on Sep. 25, 2000.

(30) Foreign Application Priority Data

Sep. 27, 1999 (JP) .......................................... 11-272027

(51) Int. Cl.$^7$ ................................................. G02F 1/13
(52) U.S. Cl. ...................................................... 349/201
(58) Field of Search .............................. 349/201, 112, 349/113; 359/584; 252/299.01

(56) References Cited

U.S. PATENT DOCUMENTS

| | | | | | |
|---|---|---|---|---|---|
| 4,786,148 A | * | 11/1988 | Sekimura et al. | ............ | 349/106 |
| 5,754,264 A | * | 5/1998 | Bryan-Brown et al. | ...... | 349/123 |
| 6,061,110 A | * | 5/2000 | Hisatake et al. | ............. | 349/112 |
| 6,068,792 A | * | 5/2000 | Watabe | ................... | 252/299.01 |
| 6,208,466 B1 | * | 3/2001 | Liu et al. | ..................... | 359/584 |

FOREIGN PATENT DOCUMENTS

| | | | | | |
|---|---|---|---|---|---|
| JP | 3-129382 A | | 6/1991 | | |
| JP | 4-107504 A | | 4/1992 | | |
| JP | 2000-089015 | * | 9/1998 | ............. | G02B/5/18 |
| JP | 1045260 A! | * | 12/1998 | ............... | g02b/5/30 |
| JP | 11-72619 A | | 3/1999 | | |
| JP | 2000-267090 | * | 3/1999 | ......... | G02F/1/1335 |
| JP | 11-60972 A | | 3/2000 | | |
| JP | 2000-89015 A | | 3/2000 | | |
| JP | 2000-89216 A | | 3/2000 | | |
| WO | WO 99/34242 A1 | | 7/1999 | | |

OTHER PUBLICATIONS

T.Niori, et al., "Distinct Ferroelectric Smectic Liquid Crystals Consisting of Banana Shaped Chiral Molecules", *J. Mater. Chem*, 6(7); 1231–1233 (1996).

T. Sekine, et al., "Spontaneous Helix Formation in Smectic Liquid Crystals Comprising Achiral Molecules", *J. Mater. Chem.* 7(8); 1307–1309 (1997).

Kondo et al., "Temperature Sensitive Helical Pitches And Wall Anchoring Effects In Homogeneous Monodomains Of Ferroelectric Sm C* Liquid Crystals, $n$OBAMBC ($n$=6–10)", *Japanese Journal Of Applied Physics,* vol. 21, No. 2, pp. 224–229 (1982).

* cited by examiner

Primary Examiner—Toan Ton
Assistant Examiner—P R. Akkapeddi
(74) *Attorney, Agent, or Firm*—Akin Gump Strauss Hauer & Feld, L.L.P.

(57) ABSTRACT

A complex diffraction device, which is excellent in designability, easy in setting the diffraction angle, adaptable to size increase, and easy to handle by adding a diffraction function resulting from an uneven pattern to the diffraction device comprising a liquid crystalline layer where the helical orientation of the smectic liquid crystal phase having a helical structure is maintained.

8 Claims, No Drawings

COMPLEX DIFFRACTION DEVICE

CROSS-REFERENCE TO RELATED APPLICATION

This application is a Continuation of International Application No. PCT/JP00/06551, filed Sep. 25, 2000, the disclosure of which is incorporated herein by reference.

FILED OF THE INVENTION

This invention relates to a complex diffraction device, which is applicable to various fields, such as optics, optoelectronics, optical information recording, and liquid crystal display devices and to various uses such as those of security and design, and can be produced so as to have a large area and handled easily.

BACKGROUND OF THE INVENTION

Diffraction devices or holograms, a type thereof, utilizing a photo-diffraction phenomenon have various functions such as a lens function, a spectrum function, a branching/multiplexing function, and an optical intensity distribution conversion. Due to these functions, they have been widely used in spectroscopic devices, hologram scanners of bar-cord readers and optical pickups of compact disks. Moreover, they have also been used for the purpose of preventing credit cards or various notes from being counterfeited, by utilizing the difficulty in counterfeit and designability of the holograms as well.

The diffraction devices are classified according to the shapes thereof into amplitude type diffraction devices and phase type diffraction devices. The amplitude type diffraction devices are those in which a light is allowed to pass through non-light-transmitting parts with a uniform thickness, such as long thin wires, periodically arranged so as to obtain diffracted light. The phase type diffraction devices are further classified into those in which periodic grooves are formed on a surface of a substrate which does not absorb light and refractive index modulation type devices in which regions where the refractive index is periodically varied are formed in a layer with a uniform thickness. Unlike the amplitude type diffraction devices, the phase type diffraction devices can be enhanced in diffraction efficiency because of the absence of a region which does not transmit light. Examples of the phase type diffraction devices each having grooves on its surface are those obtained by forming grooves on a surface of a glass, metal, or plastic. Examples of the refractive index type diffraction device are holograms made using gelatin dichromate or photo polymers.

The helical structure of a smectic liquid crystal is also known to function as one of the refractive index type diffraction devices as described in, for example, Jpn. J. Appl. Phys., Vol. 21, page 224, (1982).

In the above-mentioned use of preventing credit cards or notes from being counterfeited, a hologram is produced by embossing a thermoplastic film so as to form grooves. However, in the case of seeking more enhanced designability and anti-counterfeit properties, there is a limit for such a hologram. If a light made incident on a diffraction device can be diffracted in a plurality of directions or angles therefrom, the device can be expected to find more extensive uses.

The object of the present invention is to provide a complex diffraction device which has a refractive index modulation type diffraction function using the helical structure of a liquid crystalline phase in combination with a diffraction function using grooves formed on its surface, resulting in enhanced designability, and is easy to set diffraction angles and to handle, and adaptable to size increase.

DISCLOSURE OF THE INVENTION

The diffraction device according to the present invention is characterized in that a diffraction function originating from an uneven pattern is imparted to a diffraction device comprising a liquid crystal layer where the helical orientation of a smectic liquid crystalline phase having a helical structure is maintained.

The diffraction device according to the present invention has two types of diffraction functions one of which is obtained from the fixed helical orientation of the smectic liquid crystalline phase and the other of which is obtained from an uneven pattern formed on the surface thereof.

The smectic liquid crystalline phase of the liquid crystal layer used in the present invention denotes a liquid crystalline phase wherein the liquid crystalline molecules form a smectic layer structure which is one-dimensionally crystal and two-dimensionally liquid.

Examples of the smectic liquid crystalline phase are smectic A phase, smectic B phase, smectic C phase, smectic E phase, smectic F phase, smectic G phase, smectic H phase, smectic I phase, smectic J phase, smectic K phase, and smectic L phase. Among these, preferred are those wherein liquid crystalline molecules are aligned in tilting relation to a normal direction of the smectic liquid crystal layer, such as smectic C phase, smectic I phase, smectic F phase, smectic J phase, smectic G phase, smectic K phase, and smectic H phase.

Alternatively, in the present invention, there may be suitably used liquid crystalline phases exhibiting optical activity and ferroelectricity such as chiral smectic C phase (SmC*) chiral smectic I phase (SmI*), and chiral smectic F phase (SmF*), liquid crystalline phases exhibiting optical activity and antiferroelectricity such as chiral smectic $C_A$ phase (SmC$_A$*), chiral smectic $I_A$ phase (SmI$_A$*), and chiral smectic $F_A$ phase (SmF$_A$*), and liquid crystalline phases exhibiting optical activity and ferrielectricity such as chiral smectic $C_\gamma$ phase (Sm C$_\gamma$*), chiral smectic $I_\gamma$ phase (Sm I$_\gamma$*), and chiral smectic $F_\gamma$ phase (Sm F$_\gamma$*).

Further alternatively, there may be suitably used those which are chiral and exhibit a smectic phase having a helical structure as described in J. Matter. Chem. Vol. 6, page 1231 published in 1996 or J. Matter. Chem. Vol. 7, page 1307 published in 1997.

However, with the objective of easy synthesis of liquid crystalline materials, easy orientation of the helical structure in the smectic liquid crystalline phase, easy variation of the helical pitches, and stability of the helical structure, the most preferred is chiral smectic C phase or chiral smectic $C_A$ phase.

The term "helical structure in the smectic liquid crystalline phase" used herein denotes a structure wherein the longitudinal axes of the liquid crystalline molecules tilt at a certain angle from the vertical direction of each smectic layer, and the tilt directions twist little by little from one layer to another. The center axis of the helix in this helical structure is referred to as "helical axis", while the length in the helical axis direction for one helical turn is referred to as "helical pitch".

When a light is allowed to pass through a liquid crystal layer comprising a helical-structured smectic liquid crystalline phase, the diffraction direction of the light depends on the helical axes direction of the liquid crystalline phase. For example, in the case where the helical axes are parallel to the liquid crystal layer, a light made incident vertically thereto is diffracted to the helical axes direction. No particular limitation is imposed on the helical axes direction of the liquid crystal layer forming the complex diffraction device of the present invention. Therefore, the helical axes direction may be properly selected such that the desired characteristics can be exhibited. For example, the helical axes direction may be parallel to or tilted with respect to the liquid crystal layer surface. Furthermore, the tilt angle may be varied discretely or continuously. Moreover, the helical axes direction may be microscopically determined by the domain and may be macroscopically directed to various directions or to the same direction. The helical structure is not necessarily formed entirely in the liquid crystal layer and thus may be formed on the surface area or interior of the liquid crystal layer, or a part thereof.

The helical pitch in the liquid crystal layer is usually from 0.1 to 20 $\mu$m, preferably 0.2 to 15 $\mu$m, and more preferably 0.3 to 10 $\mu$m. The helical pitches may be constant in the liquid crystal layer, but may be varied depending on positions therein. The variation may be continuously or discretely. The helical pitches can be properly adjusted in a conventional manner, for example, by adjusting the orientation conditions such as temperature, the optical purity of the optically active portion, and the blend ratio of the optical active materials. The helical pitches correspond to the grating pitches. When a light is allowed to be made incident to the helical structure, a diffraction at angles corresponding to the helical pitches occurs. Therefore, it is necessary to properly adjust the helical pitches in order to obtain the desired diffraction angle.

In the complex diffraction device according to the present invention, the liquid crystal layer having diffractivity originating from its helical structure is provided on its surface with an uneven pattern. The pattern may be in any shape as long as it can exhibit a diffraction resulting therefrom. For example, it may have a rectangular groove-, corrugate-, saw tooth- or step-like shape formed on a flat surface at the same interval. Alternatively, the pattern may be the combination of two or more types of these uneven patterns. Further alternatively, the pattern may be designed by mixing a portion having an uneven pattern and a portion which is free thereof, or forming a region where the light is diffracted in different directions such that markings, patterns or logos emerge by diffraction.

Since the period or intervals of the uneven pattern corresponds to the grating pitches, the desired angle of diffraction can be obtained by adjusting properly the period or intervals.

The complex diffraction device may be those obtained by forming a layer having an uneven pattern and then laminating the layer on the liquid crystal layer, or by forming an uneven pattern directly thereon. In the latter case, the uneven pattern may be formed on one side or both sides of the liquid crystal layer surfaces.

In the present invention, the diffraction direction and/or angle of the liquid crystal layer may be the same as or different from those resulting from the uneven pattern. However, when consideration is given to the effects or designability of the complex diffraction device, it is preferred that the direction and/or angle of the diffraction resulting from the helical structure are partially different from those resulting from the uneven pattern.

In the liquid crystal layer forming the inventive complex diffraction device, the helical structure of the smectic liquid crystalline phase must be maintained. "Maintaining the helical structure" means that the change in the helical structure with time does not occur under the conditions where the liquid crystal layer is functioned as the complex diffraction device. One of the methods of maintaining the helical structure is to sandwich the liquid crystal layer with a pair of alignment substrates. In this method, if either one of the substrates are removed, there is a possibility that the helical structure can not be maintained in a stable state.

Another method is to fix the helical structure of the liquid crystalline phase. This method is preferred to the above-mentioned method in terms of easy production of the liquid crystal layer, heat-resistance, and practical use.

The methods of fixing the helical structure in the liquid crystalline phase are roughly classified into a glass fixing method and a polymerization fixing method. The glass fixing method is that in which the helical structure is fixed by transferring the smectic liquid crystalline phase to a glass state. Eligible liquid crystalline materials for this method are those, hereinafter referred to as "liquid crystalline material A", which can form the smectic liquid crystalline phase having a helical structure and can be in a glass state by cooling. The polymerization fixing method is that in which the smectic liquid crystalline phase having a helical structure is fixed by polymerizing or cross-linking liquid crystalline molecules. Eligible liquid crystalline materials for this method are those, hereinafter referred to as "liquid crystalline material B", which can form the smectic liquid crystalline phase having a helical structure and can be polymerized or cross-linked with light, electron beam, or heat.

More specific examples of eligible liquid crystalline materials for the liquid crystal layer are any of low-molecular weight liquid crystals and liquid crystalline polymers which are capable of forming the helical-structured smectic liquid crystalline phase. The liquid crystals only need to be those exhibiting the desired liquid crystallinity and orientation and may be a mixture of a single or plurality types of low molecule weight- and/or liquid crystalline polymer materials and a single or plurality types of low molecule weight- and/or non-liquid crystalline polymer materials.

Eligible low molecular weight liquid crystals are Schiff base compounds, biphenyl compounds, terphenyl compounds, ester compounds, thioester compounds, stillbene compounds, tolan compounds, azoxy compounds, phenyl cyclohexane compounds, pyrimidine compounds, cyclohexylcyclohexane compounds, and mixtures thereof.

The liquid crystalline polymers can be classified into main chain type- and side chain type-liquid crystalline polymers. Both of them are eligible for the liquid crystalline materials forming the liquid crystal layer of the present invention.

Examples of the main chain type liquid crystalline polymer are polyester-, polyamide-, polycarbonate-, polyimide-, polyurethane-, polybenzoimidazole-, polybenzoxazole-, polybenzothiazole-, polyazomethine-, polyesteramide-, polyestercarbonate-, and polyesterimide-based liquid crystalline polymers. Among these, particularly preferred are semi-aromatic polyester-based liquid crystalline polymers wherein mesogen providing liquid crystallinity is alternately bonded to a flexible chain, such as polymethylene, polyethyleneoxide, and polysiloxane and wholly aromatic polyester-based liquid crystals which are free of flexible chain.

Examples of the side chain type liquid crystalline polymers are those having a straight- or cyclic-main chain and a mesogen at each side, such as polyacrylate-, polymethacrylate, polyvinyl-, polysiloxane-, polyether-, polymalonate-, and polyester-based liquid crystals. Among these, particularly preferred are those wherein a mesogen providing liquid crystallinity is bonded to the main-chain via a spacer comprised of a flexible chain and those having a molecular structure wherein the main chain and the side chain both have a mesogen.

The liquid crystalline material referred herein includes those obtained by blending a chiral dopant with or introducing an optically active unit to the above-described low molecular weight and/or liquid crystalline polymers. For example, such liquid crystalline materials can be obtained by blending a chiral dopant with or introducing an optically active unit to a liquid crystalline material exhibiting smectic C phase, smectic I phase, or smectic F phase. The resulting liquid crystalline material exhibits a chiral smectic liquid crystalline phase which is easy to be aligned in a helical structure, like chiral smectic C phase, chiral smectic I phase, or chiral smectic F phase.

As described above, the helical pitch and diffraction angle of the inventive complex diffraction device can be adjusted by properly adjusting the amount of the chiral dopant, the introducing ratio of the optically active unit, the optical purity, and the temperature conditions under which a smectic liquid crystalline phase is formed. Whether a helical structure is a right-handed helix or a left-handed helix depends on the chilarlity of the chiral dopant or optically active groups to be used. Therefore, either of the helical structure having a right-handed helix or a left-handed helix can be obtained by selecting the chilarlity.

Among the above-described liquid crystalline materials, suitable for the liquid crystalline material A are the liquid crystalline polymers. Suitable for the liquid crystalline material B are those having a functional group responding to light, electron beam, or heat. Examples of such a functional group are vinyl, acryl, methacryl, vinylether, cinnamoyl, aryl, acetylenyl, crotonyl, aziridinyl, epoxy, isocyanate, thioisocyanate, amino, hydroxyl, mercapto, carboxyl, acyl, halocarbonyl, aldehyde, sulfonic acid, and silanol groups. Among these, preferred are acryl, methacryl, vinyl, vinylether, cinnamoyl, epoxy, and aziridinyl groups. Particularly preferred are acryl, methacryl, vinyl, vinylether, cinnamoyl, and epoxy groups.

These functional groups only needs to be contained in the liquid crystalline material and thus may be contained in the liquid crystalline material, non-liquid crystalline material, or one or more additives hereinafter described. In the case where the functional groups are contained in each of two or more types of materials, these functional groups may be the same or different. Furthermore, in the case where two or more functional groups are contained in one of the materials, they may be the same or different.

If necessary, when producing the liquid crystal layer of the inventive complex device, additives such as surfactants, polymerization initiators, polymerization inhibitors, sensitizers, stabilizers, catalysts, dyes, pigments, ultraviolet absorbers, and adhesion improvers may be blended in an amount of 50 percent by mass or less, preferably 30 percent by mass or less, and more preferably 10 percent by mass or less, based on the total mass.

The liquid crystal layer of the inventive complex device can be produced by developing the liquid crystalline material, if necessary, together with the additives and maintaining a helical structure.

No particular limitation is imposed on two interfaces on both sides of the liquid crystalline material upon developing, which interfaces, therefore, may be gaseous phase-, liquid phase- or solid phase-interfaces and not need to be the same. However, with the objective of easy production of the liquid crystal layer, it is recommended to employ two interfaces both of which are solid or one of which is solid and the other of which is gaseous.

Examples of the gaseous phase interface are air- and nitrogen-interface. Examples of the liquid phase interface are-water, organic solvents, liquefied metals, other liquid crystals, and melted polymeric compounds. Examples of the solid phase interface are plastic film substrates comprised of polyimide, polyamideimide, polyamide, polyetherimide, polyether ether ketone, polyether ketone, polyketone sulfide, polyethersulfone, polysulfone, polyphenylenesulfide, polyphenylene oxide, polyethylene terephthalate, polybutylene terephthalate, polyethylene naphthalate, polyacetal, polycarbonate, polyallylate, acrylic resins, methacrylic resins, polyvinyl alcohol, polyethylene, polypropylene, poly-4-methylpentene-1 resin, and cellulose-based plastics such as triacetyl cellulose, epoxy resins, polyphenol resins, and liquid crystalline polymers; metal substrates such as aluminum, iron and copper; glass substrates such as blue glass sheet, alkaline glass, non-alkaline glass, borosilicate glass, flint glass and quarts glass; ceramic substrates; and various semi-conductor substrates such as silicon wafers. Eligible solid phase interfaces are also those obtained by forming a film which may be an organic film comprised of polyimide, polyamide, or polyvinyl alcohol, an obliquely deposited film of silicon dioxide or the like, or a transparent electrode of ITO (indium-tin oxide), or obtaining by depositing or sputtering a metal film of gold, aluminum or copper, on the above-described substrates. Furthermore, another eligible solid phase interfaces are thin film transistors (TFT) of amorphous silicon.

These various substrates may be subjected to an alignment treatment if necessary. In the case of using such substrates, the direction of the helical axes in the resulting liquid crystal layer can be settled in one direction which is determined by the direction of the alignment of the substrates. Depending on the type of liquid crystalline material and solid phase interface and the method of aligning, the direction of the helical axes does not always coincide with the alignment direction of the substrates and may be shifted therefrom. The complex diffraction device of the present invention even if containing such a liquid crystal layer can still perform the effects of the complex diffraction device. Furthermore, in the present invention, it is possible to obtain a complex diffraction device wherein the direction of the helical axes is fixed in one pattern, by altering the aligning direction partially. In the case of using such a method, it is possible to obtain a complex diffraction device which can exhibit a complex diffraction effect caused by the smectic liquid crystal having a helical structure as well as a diffraction effect resulting from the diffraction pattern, for example, by arranging the pattern of regions wherein the helical axes directions are different periodically to an extent that the interference of light occurs.

In the case of not subjecting the substrates to an alignment treatment, the resulting liquid crystal layer possibly assumes a multi-domain layer wherein the helical axes directions in each domain are random. However, even such a liquid crystalline phase can provide the resulting device with the effects as the complex diffraction device.

No particular limitation is imposed on the alignment treatment subjected to the various substrates. Examples of the alignment treatment are rubbing, oblique depositing, microgrooving, polymer film drawing, LB (Langmuir-Blodgett) filming, transferring, photo irradiating (photo isomerization, photo polymerization, and photo decomposition), and peeling methods. Particularly with the objective of simplified production process, preferred are rubbing and photo irradiation methods.

Furthermore, even in the case of using the various substrates as the solid phase interfaces, which have not been subjected to an alignment treatment, it is possible to obtain the liquid crystal layer with the helical axes directions regulated in a certain direction, by applying magnetic or electric field or shear stress to the liquid crystalline material developed between the interfaces; fluidizing or drawing the liquid crystalline material; or subjecting the same to temperature gradient.

No particular limitation is imposed on the method of developing the liquid crystalline material between the above-described interfaces. Therefore, any suitable methods known in the field can be employed. For example, in the case of developing the liquid crystalline material between two substrates, the liquid crystalline material is injected into a cell formed with these substrates. Alternatively, there may be employed a method in which the liquid crystalline material is laminated with the substrates.

In the case of using one substrate and a gaseous interface, the liquid crystalline material can be developed by coating it directly on the substrate or dissolving it in a suitable solvent before coating. In the present invention, with the objective of simplified production processes, it is preferred to coat the liquid crystal after being dissolved in a solvent.

A suitable solvent for this purpose can be selected in accordance with the type of liquid crystalline material and the composition thereof. Generally, the examples of the solvent are halogenated hydrocarbons such as chloroform, dichloromethane, carbon tetrachloride, dichloroethane, tetrachloroethane, trichloroethylene, tetrachloroethylene, chlorobenzene, and ortho-dichlorobenzene, phenols such as phenol and parachlprophenol, aromatic hydrocarbons such as benzene, toluene, xylene, methoxybenzene, and 1,2-dimethoxybenzene, alcohols such as isopropyl alcohol and tert-butylalcohol, glycols such as glycerin, ethylene glycol, and triethylene glycol, glycol ethers such as ethylene glycol monomethylether, diethylene glycol dimethylether, ethyl cellosolve and butyl cellosolve, acetone, methylethyl ketone, ethyl acetate, 2-pyrrolidone, N-methyl-2-pyrrolidone, pyridine, triethylamine, tetrahydrofuran, diemthylformamide, dimethylacetoamide, dimethylsulfoxide, acetonitrile, butyronitrile, carbon disulfied, and mixtures thereof. If necessary, surfactants or the like may be added to the solvent so as to adjust the surface tension and improve the coatability.

It is necessary to adjust the concentration of the liquid crystalline material in the solution depending on the type of liquid crystalline material, solubility thereof, and the film thickness of the final liquid crystal layer. However, it is within the range of usually 3 to 50 percent by mass, and preferably 5 to 30 percent by mass.

No particular limitation is imposed on the method of coating the solution. There may be used spin-coat, roll-coat, print, dip, curtain-coat, wire bar coat, doctor blade, knife coat, die coat, gravure coat, micro gravure coat, offset gravure coat, lip coat, and spray coat methods. After coating, the solvent may be dried out if necessary.

After the liquid crystalline material which can exhibit the helical structured smectic liquid crystalline phase is developed between the various interfaces by the above-described method so as to be formed into a uniform layer, the inventive complex diffraction device can be obtained by forming the liquid crystalline material so as to assume the helical orientation in the desired helical-structured smectic liquid crystalline phase. No particular limitation is imposed on the method of forming the liquid crystalline material so as to assume the helical orientation in the smectic liquid crystalline phase. There may be suitably employed a method depending on the type of liquid crystalline material. For example, in the case of developing the liquid crystalline material at a temperature at which the material can be formed so as to assume the helical structured smectic liquid crystalline phase, the helical structured smectic liquid crystalline phase may be obtained at the same time. The developed liquid crystalline material is once heated at a temperature higher than that at which the helical structured smectic liquid crystalline phase appears, such that a smectic A phase, a chiral nematic phase or an isotropic phase appears, and after a certain period of time it is oriented so as to assume the helical structure by cooling to a temperature at which a smectic liquid crystalline phase appears.

After the helical structured smectic liquid crystalline phase appears in the liquid crystal layer by any of the above-described methods, the helical structure of the smectic liquid crystalline phase is fixed by any suitable method selected depending on the type and composition of liquid crystalline material. In order to fix the helical structure, it is preferred to use the above-described glass fixing method or polymerization fixing method.

In the case of using the glass fixing method, the helical structured smectic liquid crystalline phase which appears at a temperature higher than the glass transition temperature of the liquid crystalline material A is fixed by cooling the liquid crystal layer to a temperature at which the liquid crystalline material A is in a glass state. The cooling may be natural cooling or forced cooling.

In the case of using the polymerization fixing method, the helical structured smectic liquid crystalline phase which appears when the liquid crystalline material B is in a liquid crystalline state is fixed by polymerizing or cross-linking the liquid crystalline material B. The method of polymerizing or cross-linking may be thermal polymerization, photo polymerization, radiation polymerization of $\gamma$ ray or the like, electron beam polymerization, polycondensation, or polyaddition. Among these, preferred are photo polymerization and electron beam polymerization because they are easy to control.

The liquid crystal layer fixed by the foregoing method is free from disorder in orientation even after removing the substrate and can be used as a complex diffraction device wherein the helical orientation is fixed. The film thickness of the resulting liquid crystal layer is within the range of generally 0.1 to 100 $\mu$m, preferably 0.2 to 50 $\mu$m, and more preferably 0.3 to 20 $\mu$m, with the objective of orientability and productivity.

In the present invention, the liquid crystal layer described above is provided with a diffraction function originating form the uneven patterns and recesses formed thereon. The diffraction function may be provided on the liquid crystal layer with the substrate or after removing the substrate. Alternatively, the resulting liquid crystal layer is transferred to another substrate and an uneven pattern is formed on the layer with the substrate. Further alternatively, a plurality of the liquid crystal layers having the same or different diffraction properties are laminated, and the diffraction function originating from an uneven pattern is provided thereon.

Examples of the substrate are plastic substrates formed from polyimide, polyamideimide, polyamide, polyetherimide, polyether ether ketone, polyether ketone, polyketone sulfide, polyether sulfone, polysulfone, polyphenylene sulfide, polyphenylene oxide, polyethylene terephthalate, polybutylene terephthalate, polyethylene naphthalate, polyacetal, polycarbonate, polyallylate, acrylic resins, methacrylic resins, polyvinyl alcohol, polyethylene, polypropylene, poly-4-methylpentene-1 resin and cellulose-based plastics such as triacetyl cellulose, epoxy resins, and polyphenol resins; glass substrates; ceramic substrates; papers; and metal substrates. Furthermore, eligible substrates are optical elements such as polarizing plates, retardation plates, and reflecting plates, scattering films, and various liquid crystalline films such as nematic films and cholesteric films.

No particular limitation is imposed on the method of providing an uneven pattern. There may be employed a method in which another layer having a diffraction function originating from an uneven pattern is laminated over the liquid crystal layer of the present invention or a method in which a diffraction pattern is provided by forming an uneven pattern directly on the surface of the liquid crystal layer. Examples of the layer having a diffraction function are plastic films or glass substrates having a diffraction function.

The method of forming an uneven pattern may be exemplified by a method in which projections and recesses are formed on the liquid crystal surface with an etching technique, or an embossing processing in which a mold having a form of diffraction gratings hereinafter referred to as "embossed plate" is pressed on the liquid crystal layer with a press machine or in which a film having a form of diffraction gratings hereinafter referred to as "embossed film" is laminated over the liquid crystal layer using a laminate machine or the like so as to transfer the diffraction gratings on the liquid crystal layer. In the present invention, it is preferred to provide a diffraction function originating from an uneven pattern by subjecting the liquid crystal layer surface to the embossing processing.

No particular limitation is imposed on the embossed plate and film. Most of the embossed plates are structures formed from metals or resins and having diffraction gratings. The embossed film may be a film obtained by forming diffraction gratings on a surface of a free-standing film or a laminate of a self-supportive film and a layer with diffraction gratings.

After the embossing processing, mostly the embossed plate or film is peeled off from the film or substrate containing the liquid crystal layer. However, in the case of using the embossed film, it is possible to use the liquid crystal layer with the film pressed as a laminate.

At a temperature at which the embossing processing is carried out, the liquid crystal layer must have a fluidity within a suitable range. The temperature for the embossing processing can not be determined with certainty since it depends on the thermal characteristics of the liquid crystal layer such as the glass transition temperature (Tg) and the degree of cross-linking, the substrate of the liquid crystal layer, the type of embossed plate or film, or the method of embossing transfer. However, the embossing processing is carried out from room temperature to 300° C., preferably room temperature to 200° C. That is, it is requisites that the disorder in the helical orientation state of the liquid crystal layer hardly occurs at the temperature of the embossing transfer during the period thereof without losing the effects achieved by the present invention after the embossing transfer. It is also requisites to be able to effect the embossing processing efficiently if selecting proper conditions for the embossing transfer and obtain an emboss-processed liquid crystal layer with the effects of the present invention.

Although it is extremely difficult to describe such a temperature range quantitatively and is impossible to specify it with a single physical quantity, the glass transition temperature (Tg) of the liquid crystal layer after the orientation may be used as an index. In the case of using a liquid crystalline polymer or oligomer as the liquid crystalline material used in the present invention, the glass transition temperature exists inmost of the polymers or oligomers. When the fluidity of such polymers or oligomers is measured with increasing the temperature thereof, it is known that the fluidity is gradually increased from a poor state resulting from the glass fixing once the temperature reaches around the glass transition temperature. Therefore, in the case of using a polymer or oligomer wherein the glass transition temperature exists, the embossing processing can be applied to the liquid crystal layer whose glass transition temperature is within range of from room temperature to 200° C. after the orientation. If the glass transition temperature is room temperature or less, the fluidity upon the embossing processing becomes too high and thus orientation disorder is prone to occur. If the glass transition temperature is in excess of 200° C., it becomes difficult to effect the emboss processing in the usual manner adequately to provide the effects achieved by the present invention.

The resulting emboss-processed liquid crystal layer may be put in use as it is, but may be further cured by light irradiation or thermal cross-linking with the objective of reliability in terms of temperature, humidity, and solvents, and mechanical strength. In the case of using a light cross-linkable liquid crystalline composition and fixing it by the method for the liquid crystalline material B, there may be used a method in which after the orientation is fixed to a certain extent by light irradiation once after the orientation is formed, the diffraction grating is formed, followed by another light irradiation so as to cure the liquid crystal layer.

The complex diffraction device of the present invention may be provided on its surface with a protective layer formed of the above-mentioned transparent plastic film of a hard coat layer for the purpose of protecting the surface, increasing the strength, and enhancing the environmental reliability.

The complex diffraction device can be used in various purposes, for example, as light pickups of CDs, DVDs or magneto-optical disks, or optical elements for improving the viewing angle or the brightness of liquid crystal displays; designable films utilizing rainbow coloration caused by diffraction; optical information recording devices; anti-counterfeit security films for credit cards or notes; and combiner for head-up displays.

Applicability in the Industry

The complex diffraction device of the present invention comprises a liquid crystal layer with the helical orientation of a helical structured smectic liquid crystalline phase maintained, and is further provided with a diffraction function resulting from an uneven pattern formed on the layer. Therefore, the inventive device has an effect of diffraction in a plurality of directions or angles. Furthermore, the inventive device can be built in another optical system because it is adaptable to large size, and is light, low in manufacturing cost, and easy to handle. Therefore, the inventive device is applicable to optics, optoelectronics, optical information recording, and liquid crystal display devices, and to various uses such as those of security and design, and is highly valuable in the industry.

Best Mode of Carrying out the Invention

The present invention will be further described with reference to the following examples but is not limited thereto.

In the following examples, the measurement of inherent viscosity, the determination of liquid crystal series, and the measurement of film thickness are conducted in accordance with the following methods.

(1) Measurement of Inherent Viscosity

Measured in a mixed solvent of phenol and tetrachloroethane in a weight ratio of 60/40 at a temperature of 30° C. using a Ubbelohde's viscometer (2) Determination of Liquid Crystalline Phase Determined by DSC (differential scanning calorimeter) analysis using Perkin Elmer DSC-7 and observation through an optical microscope, BH2 polarizing microscope manufactured by Olympus Optical Co., Ltd.

(3) Measurement of Film Thickness

Measured using a surface texture analysis system Dektak 3030ST manufactured by ULVAC Inc. Also used a method of obtaining the film thickness from the interference wave measurement with a ultraviolet, visible and near-infrared spectrophotometer V-570 manufactured by JASCO Corporation and data from index of refraction.

EXAMPLE 1

A liquid crystalline polyester was prepared by melt-polymerizing, 200 mmol dimethyl biphenyl-4,4'-dicarboxylate, 120 mmol (S)-2-methyl-1,4-butanediol (enantiomeric excess, e. e.=50.0%), and 80 mmol 1,6-hexanediol using tetra-n-butyl orthotitanate at a temperature of 220° C. for 2 hours. The inherent viscosity of the resulting polyester was 0.18 dL/g.

A tetrachloroethane solution of 10 weight percent of the resulting polyester was prepared and spin-coated on a polyphenylene sulfide substrate with a rubbed polyimide film, followed by removal of the solvent on a hot plate at a temperature of 60° C. After the substrate was heated in an oven at a temperature of 180° C. for 10 minutes so as to be oriented in a smectic A phase, it is cooled to a temperature of 120° C. at which it is oriented so as to assume a smectic C phase, at a rate of 4° C./minute. The substrate was taken out from the oven and cooled to room temperature thereby fixing the orientation of the liquid crystalline polymer so as to be in a glass state (Sample 1). The resulting liquid crystal layer was-transferred to a triacetyl cellulose film with an adhesive thereby obtaining Sample 2.

The liquid crystal layer in Sample 2 was glass-fixed, assuming a chiral smectic C phase having a helical structure and uniform in film thickness (1.1 $\mu$m). The polarizing microscope observation and the cross section electron microscope observation confirmed that the helical pitches of the helical structure of the liquid crystal layer in Sample 2 were about 1.0 $\mu$m. It was also found that the helical axes directions did not conform with the rubbing direction and was offset therefrom at an angle of about 10° in the anti-clockwise direction.

A commercially available embossed film J52,989 manufactured by Edmond Scientific Japan Co., Ltd. was cut into such, a rectangle piece of 20 cm×15 cm that the diffraction direction of the diffraction grating was the direction of the long side and then superposed on Sample 2 such that the liquid crystal layer thereof was in contact with the diffraction grating surface. The helical axes direction of Sample 2 was approximately perpendicular to the grating direction of the diffraction grating. One shorter side of the embossed film was then fixed to Sample 2 with a cellophane tape and inserted through a thermolaminating apparatus DX-350 manufactured by Torami Co., Ltd. so that the shorter side was the head end. The thermolamination was carried out at a laminating roll temperature of 75° C., and the speed of travel of the sample was 25 mm per second. After thermolaminating, Sample 2 and the embossed film were in close contact with each other in one body. The resulting laminate was cooled to room temperature, and the film was gently removed from Sample 2. It was found a that the liquid crystal layer remaining on the triacetyl cellulose substrate was fixed in the helical orientation state of a smectic liquid crystal, and had the uneven pattern transferred from the embossed film thereby obtaining Sample 3.

When a light was vertically made incident upon the surface of Sample 3, a diffraction occurred in the helical direction at a diffraction angle of about 40° and also a diffraction resulting from the uneven pattern of the embossed film occurred perpendicularly to the helical axes at a diffraction angle of 35°. Therefore, it is confirmed that Sample 3 functioned as the complex diffraction device of the present invention.

EXAMPLE 2

The same procedures of Example 1 were followed except that the helical axes were approximately parallel to the grating direction of the embossed film thereby obtaining Sample 4.

When a light was vertically made incident upon the surface of Sample 4, a diffraction occurred in the helical direction at a diffraction angle of about 40° and also a diffraction resulting from the uneven r pattern of the embossed film occurred parallel to the helical axes at a diffraction angle of 35°. Therefore, it is confirmed that Sample 4 functioned as a complex diffraction device of the present invention.

EXAMPLE 3

Sample 1 was subjected to the same embossing processing as that of Example 1. Thereupon, Sample 1 was laminated on the embossed film such that the helical axes direction were offset from the grating direction of the embossed film at an angle of about 30°. The resulting liquid crystal layer with the uneven pattern formed on the polyphenylene sulfide substrate was transferred to a triacetyl cellulose film with an adhesive thereby obtaining Sample 5. The liquid crystal surface of Sample 5 was subjected to the same embossing processing again. Thereupon, the embossed film was arranged such that the grating direction was offset from the helical axes of Sample 5 at an angle of about 30° in the reverse side from the first embossing site thereby obtaining Sample 6.

When a light was vertically made incident upon the surface of Sample 6, a diffraction occurred in the helical direction at a diffraction angle of about 40° and also a diffraction resulting from the uneven pattern of the embossed film occurred at a diffraction angle of 35° in the direction of about ±30° with respect to the helical axes direction. Therefore, it is confirmed that Sample 6 functioned as the complex diffraction device of the present invention.

EXAMPLE 4

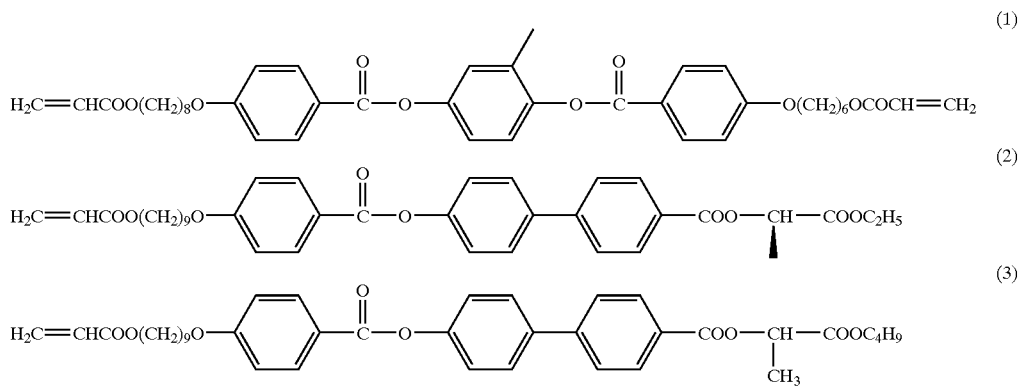

There was prepared a γ-butyrolactone solution containing 15 percent by mass of a mixture of a bi-functional low molecular weight liquid crystal represented by the above formula (1), a mono-functional chiral liquid crystal represented by the above formula (2), and a racemic mono-functional liquid crystal represented by formula (3) mixed at a weight ratio of 10:80:10, 0.2 percent by mass of Irugacure 907 manufactured by Ciba Speciallity Chemicals Co. used as a photo-polymerization initiator, 0.02 percent by mass of KAYACURE DETX manufactured by Nippon Kayaku Co., Ltd. as a sensitizer, and 0.05 percent by mass of Megaface F-144D manufactured by Dai Nippon Ink and Chemicals Inc as a surfactant.

The resulting solution was spin-coated on a rubbing-treated polyethylene terephthalate (PET) substrate, and the solvent was removed at a temperature of 60° C. After the substrate was then heated at a temperature of 100° C. in an oven for 3 minutes so as to be oriented in a smectic A phase, it was cooled to a temperature of 60° C., at which it is oriented in a smectic C phase, at a rate of 5° C. per minute and maintained at a temperature of 60° C. for 3 minutes. Thereupon, nitrogen-substitution was done so as to make the oxygen concentration 3 percent by volume or less. Thereafter, the orientation of the liquid crystalline material was fixed by a photo-polymerization at an irradiation energy of 200 mJ/cm$^2$ using an ultraviolet irradiation device having a high-pressure mercury lump of 120 W/cm while maintaining a temperature of 60° C. The resulting liquid crystal layer on the PET substrate was fixed, assuming a chiral smectic C phase having a helical structure and uniform in film thickness (1.2 μm). The polarizing microscope observation and the cross section electron microscope observation confirmed that the helical pitches of the helical structure of the liquid crystal layer were about 1.3 μm. It was also found that the helical axes direction did not conform with the rubbing direction and was offset at an angle of about 13° in the anti-clockwise direction thereby obtaining Sample 7.

Similarly to Example 1, Sample 7 was laminated on the embossed film at a temperature of 55° C. Thereafter, Sample 7 with the embossed film laminated was further subjected to a light irradiation of 800 mJ thereby curing the liquid crystal layer completely. The embossed film was removed from the liquid crystal layer thereby obtaining Sample 8.

When a light was vertically made incident upon the surface of Sample 8, a diffraction occurred in the helical direction at a diffraction angle of about 29° and also a diffraction resulting from the uneven pattern of the embossed film occurred perpendicularly to the helical axes at a diffraction angle of 35°. Therefore, it is confirmed that Sample 8 functioned as the complex diffraction device of the present invention.

EXAMPLE 5

A liquid crystalline polyester was prepared by melt-polymerizing 200 mmol dimethyl biphenyl-4,4'-dicarboxylate, 80 mmol (R)-1,3-butanediol (enantiomeric excess, e. e.=95.0%), and 120 mmol 1,5-pentane diol using tetra-n-butyl orthotitanate at a temperature of 220° C. for 2 hours. The inherent viscosity of the resulting polyester was 0.20 dL/g.

An N-methyl-2-pyrrolidone solution of 10 percent by mass of the resulting polyester was prepared and spin-coated on a rubbing-treated PET film substrate, followed by removal of the solvent on a hot plate at a temperature of 60° C. After the substrate was heated in an oven at a temperature of 120° C. for 10 minutes, it was taken out therefrom and cooled to room temperature so as to fix the orientation of the liquid crystalline polyester in a glass state, thereby obtaining Sample 9.

The liquid crystal layer in Sample 9 was glass-fixed, assuming a chiral smectic $C_A$ phase with a helical structure and uniform in film thickness (1.2 μm). The polarizing microscope observation and the cross section electron microscope observation confirmed that the helical pitches of the helical structure of the liquid crystal layer in Sample 9 were about 0.8 μm.

Similarly to Example 1, Sample 9 was laminated on the embossed film at a temperature of 75° C. thereby obtaining Sample 10.

When a light was vertically made incident upon the surface of Sample 10, a diffraction occurred in the helical direction at a diffraction angle of about 52° and also a diffraction resulting from the uneven pattern of the embossed film occurred perpendicularly to the helical axes at a diffraction angle of 35°. Therefore, it is confirmed that Sample 10 functioned as the complex diffraction device of the present invention.

What is claimed is:

1. A complex diffraction device wherein a diffraction function resulting from a pattern of periodic grooves formed on a liquid crystal layer surface is added to a diffraction device comprising a thin film liquid crystal layer where a helical orientation of a smectic liquid crystalline phase having a helical structure is maintained and helical axes of the liquid crystal layer are in a direction parallel to a cross section of the liquid crystal layer surface, and wherein the liquid crystal layer exhibits diffractivity originating from the helical structure.

2. A complex diffraction device wherein a diffraction function resulting from a pattern of periodic grooves is added to one or both surfaces of a diffraction device comprising a thin film liquid crystal layer where a helical orientation of a smectic liquid crystalline phase having a helical structure is maintained and helical axes of the liquid crystal layer are in a direction parallel to a cross section of the liquid crystal layer surface, and wherein the liquid crystal layer exhibits diffractivity originating from the helical structure.

3. The complex diffraction device according to claim 1, wherein at least one of a diffraction direction and an angle of the diffraction device comprising a thin film liquid crystal layer where the helical orientation of the smectic liquid crystalline phase having a helical structure is maintained is different on at least a part of the device from that of a diffraction resulting from the pattern of periodic grooves.

4. The complex diffraction device according to claim 1, wherein said thin film liquid crystal layer is formed by orienting a thin film of a liquid crystalline material which can exhibit a helical-structured smectic liquid crystalline phase at a temperature which is the glass transition temperature or higher and cooling it to be in a glass state so as to fix the helical structure of the smectic liquid crystalline phase formed in the liquid crystal layer.

5. The complex diffraction device according to claim 1, wherein said thin film liquid crystal layer is formed by orienting a thin film of a liquid crystalline material which can exhibit a helical-structured smectic liquid crystalline phase at a temperature at which the liquid crystalline material exhibits the liquid crystalline phase, and polymerizing the liquid crystalline material with the orientation maintained so as to fix the helical structure of the smectic liquid crystalline phase formed in tho liquid crystal layer.

6. The complex diffraction device according to claim 1, wherein the helical structured smectic liquid crystalline phase formed in the liquid crystal layer is a chiral smectic C phase.

7. The complex diffraction device according to claim 1, wherein the helical structured smectic liquid crystalline phase formed in the liquid crystal layer is a chiral smectic $C_A$ phase.

8. A method of producing a complex diffraction device comprising preparing a thin film liquid crystal layer having a helical structure of a smectic liquid crystalline phase from a liquid crystalline material exhibiting a smectic liquid crystalline phase with a helical structure wherein helical axes of the liquid crystal layer are in it direction parallel to a cross section of a liquid crystal layer surface and the liquid crystal layer exhibits diffractivity originating from the helical structure, and subjecting the surface of the liquid crystal layer to an embossing processing to provide a diffraction function resulting from a pattern of periodic grooves.

\* \* \* \* \*